(12) United States Patent
Rizk et al.

(10) Patent No.: US 11,748,559 B2
(45) Date of Patent: Sep. 5, 2023

(54) AUTO GENERATION OF CONVERSATIONAL ARTIFACTS FROM SPECIFICATIONS

(71) Applicant: International Business Machines Corporation, Armonk, NY (US)

(72) Inventors: Yara Rizk, Cambridge, MA (US); Vatche Isahagian, Belmont, MA (US); Yasaman Khazaeni, Needham, MA (US); Scott Boag, Woburn, MA (US); Falk Pollok, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 224 days.

(21) Appl. No.: 17/210,902

(22) Filed: Mar. 24, 2021

(65) Prior Publication Data
US 2022/0309240 A1 Sep. 29, 2022

(51) Int. Cl.
*G06F 40/20* (2020.01)
*G06N 3/04* (2023.01)
*G06F 40/30* (2020.01)

(52) U.S. Cl.
CPC .............. *G06F 40/20* (2020.01); *G06F 40/30* (2020.01); *G06N 3/04* (2013.01)

(58) Field of Classification Search
CPC ........ G06F 40/20; G06F 40/30; G06F 40/205; G06F 40/242; G06F 40/295; G06F 40/35; G06N 3/04
See application file for complete search history.

(56) References Cited

U.S. PATENT DOCUMENTS

| | | | |
|---|---|---|---|
| 10,503,834 B2 | 12/2019 | Bachrach et al. | |
| 10,635,695 B2 | 4/2020 | Seth et al. | |
| 2003/0225571 A1* | 12/2003 | Levin | G10L 13/08 704/E15.02 |
| 2008/0181516 A1* | 7/2008 | Jackson | G06F 16/25 382/236 |

(Continued)

FOREIGN PATENT DOCUMENTS

| | | |
|---|---|---|
| EP | 3525107 A1 | 8/2019 |
| JP | H03-110630 A | 5/1991 |

(Continued)

OTHER PUBLICATIONS

Puzikov, Y., & Gurevych, I. (Nov. 2018). E2e nig challenge: Neural models vs. templates. In Proceedings of the 11th International Conference on Natural Language Generation (pp. 463-471). (Year: 2018).*

(Continued)

*Primary Examiner* — Bhavesh M Mehta
*Assistant Examiner* — Philip H Lam
(74) *Attorney, Agent, or Firm* — Peter Edwards; McGinn I.P. Law Group, PLLC

(57) ABSTRACT

A conversational interface generation method, system, and computer program product that includes determining a conversational artifact for a computer program from a specification of the computer program and generating a conversational interface for the computer program based on the conversational artifact for the computer program included in the specification.

20 Claims, 9 Drawing Sheets

(56) References Cited

U.S. PATENT DOCUMENTS

| | | | |
|---|---|---|---|
| 2016/0035353 A1* | 2/2016 | Chen | G10L 13/08 |
| | | | 704/235 |
| 2019/0066694 A1* | 2/2019 | Hirzel | G06F 8/30 |
| 2019/0140989 A1 | 5/2019 | Wise et al. | |
| 2019/0197111 A1* | 6/2019 | Garrote | G06F 40/30 |
| 2019/0213244 A1* | 7/2019 | Hirzel | G06F 40/35 |
| 2019/0213465 A1 | 7/2019 | Avrahami et al. | |
| 2019/0294678 A1 | 9/2019 | Sapugay et al. | |
| 2020/0050666 A1* | 2/2020 | Srivastava | G06F 40/289 |
| 2020/0219494 A1* | 7/2020 | Dhoolia | G10L 15/16 |
| 2021/0050006 A1* | 2/2021 | Andreas | G06N 5/025 |
| 2021/0081848 A1* | 3/2021 | Polleri | G06F 8/77 |
| 2021/0124805 A1* | 4/2021 | Hu | G10L 13/027 |
| 2021/0294976 A1* | 9/2021 | Markarian | G06F 40/253 |
| 2021/0397796 A1* | 12/2021 | Dounis | G06F 40/232 |
| 2022/0215181 A1* | 7/2022 | Lewis | G06F 40/56 |

FOREIGN PATENT DOCUMENTS

| | | | | |
|---|---|---|---|---|
| WO | WO-2019227099 A1 * | 11/2019 | | |
| WO | WO-2021050170 A1 * | 3/2021 | | G06F 40/30 |

OTHER PUBLICATIONS

Baez, M., Daniel, F., Casati, F., & Benatallah, B. (2020). Chatbot integration in few patterns. IEEE Internet Computing, 25(3), 52-59. (Year: 2020).*

Mel, et al. "The NIST Definition of Cloud Computing". Recommendations of the National Institute of Standards and Technology. Nov. 16, 2015.

* cited by examiner

AUTO GENERATION OF CONVERSATIONAL ARTIFACTS FROM SPECIFICATIONS

BACKGROUND

The present invention relates generally to a conversational interface generation method, and more particularly, but not by way of limitation, to a system, method, and computer program product for automatically creating conversational artifacts using specification documents in Natural Language Understanding (NLU) and Natural Language Generation (NLG) platforms.

Conventional conversation agent generating techniques require intensive computations and human monitoring of the creation process. The conventional conversation agents are limited in their scope as a result.

Conversational agents (or chatbots) are generally manually (i.e., human) designed by conversation designers in chatbot authoring tools. Creating a chatbot involves the creation of multiple conversational artifacts like intents, entities and dialog nodes. This process is time consuming, cumbersome, and requires special training. Conventional techniques have attempted to automate this process by adopting deep learning based language models. However, these models provide little control for conversation designers over the dialog content and experience. Also, the models tend to behave unpredictably in certain situations. In service industries, there is a lot of business domain knowledge compiled in business artifacts and verbalization artifacts (i.e., business object model (BOM) files and Key-value property verbalization (VOC) files) that can be leveraged to automate the process of authoring chatbots without resorting to deep learning-based language models.

Furthermore, the functions performing actions in the chatbot possess input and output dictionaries that can also be leveraged to create the chatbot.

SUMMARY

Thus, the inventors have considered a technical solution to the technical problem in the conventional techniques by introducing a technique that can extract artifacts required to create a conversational agent from business domain knowledge while keeping human oversight out of the agent creation loop and does not use previous conversational logs but instead uses the business domain knowledge and function specifications.

In an exemplary embodiment, the present invention can provide a computer-implemented conversational interface generation method, the method including determining a conversational artifact a for a computer program from a specification of the computer program and generating a conversational interface for the computer program based on the conversational artifact for the computer program included in the specification.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings.

Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 2 exemplarily depicts an interface to automate the creation of entities;

DETAILED DESCRIPTION

Figure 1:
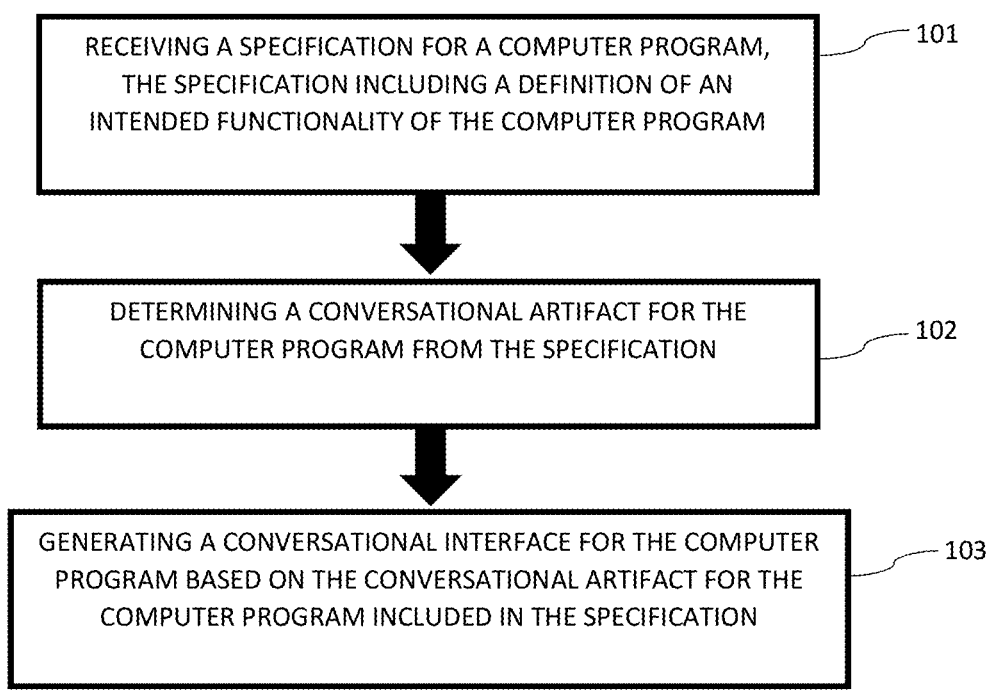
FIG. 1 exemplarily shows a high-level flow chart for a conversational interface generation method 100.

The invention will now be described with reference to FIG. 1-9, in which like reference numerals refer to like parts throughout. It is emphasized that, according to common practice, the various features of the drawing are not necessarily to scale. On the contrary, the dimensions of the various features can be arbitrarily expanded or reduced for clarity.

With reference now to the exemplary method 100 depicted in FIG. 1, the conversational interface generation method 100 includes various steps for creating conversational artifacts and enabling chatbots to capture the data required by such functions from ingested specifications.

Figure 7:
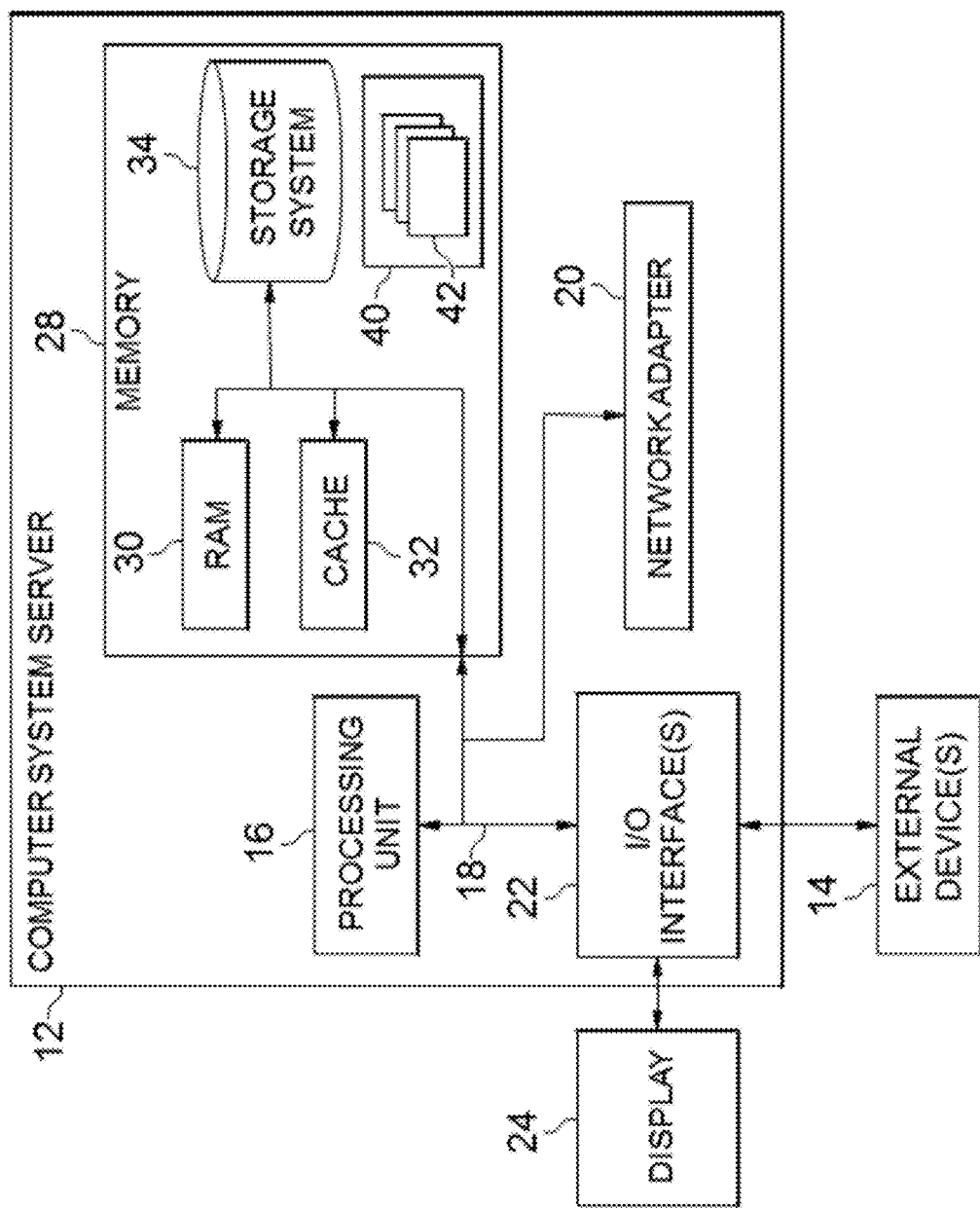
FIG. 7 depicts a cloud computing node 10 according to an embodiment of the present invention.

As shown in at least FIG. 7, one or more computers of a computer system 12 according to an embodiment of the present invention can include a memory 28 having instructions stored in a storage system to perform the steps of FIG. 1.

The conversational interface generation method 100 according to an embodiment of the present invention may act in a more sophisticated, useful and cognitive manner, giving the impression of cognitive mental abilities and processes related to knowledge, attention, memory, judgment and evaluation, reasoning, and advanced computation. A system can be said to be "cognitive" if it possesses macro-scale properties—perception, goal-oriented behavior, learning/memory and action—that characterize systems (i.e., humans) generally recognized as cognitive.

Although one or more embodiments (see e.g., FIGS. 7-9) may be implemented in a cloud environment 50 (see e.g., FIG. 8), it is nonetheless understood that the present invention can be implemented outside of the cloud environment.

With reference generally to FIGS. 1-6, the invention includes a set of steps that generate the main conversational artifacts from the available corresponding business domains information. That is, the invention focuses on the conversational agent building phase as opposed to a runtime phase. The invention described in FIGS. 1-6 obtains the artifacts needed to define the conversational agent from business domain knowledge instead of manually building the agent to start with.

With reference specifically to FIG. 1 and a high-level overview of the invention, in step 101, a specification for a computer program is received where the specification includes a definition of an intended functionality of the computer program. In step 102, at least one of an intent, an entity, a dialog node and a context variable is determined for the computer program from the specification. It is noted that a dialog node can be used to obtain a value for a context variable but it can also be used to just provide a response. And, in step 103, a conversational interface is generated for the computer program based on the at least one of the intent, the entity, the dialog node and the context variable for the computer program included in the specification.

Figure 6:
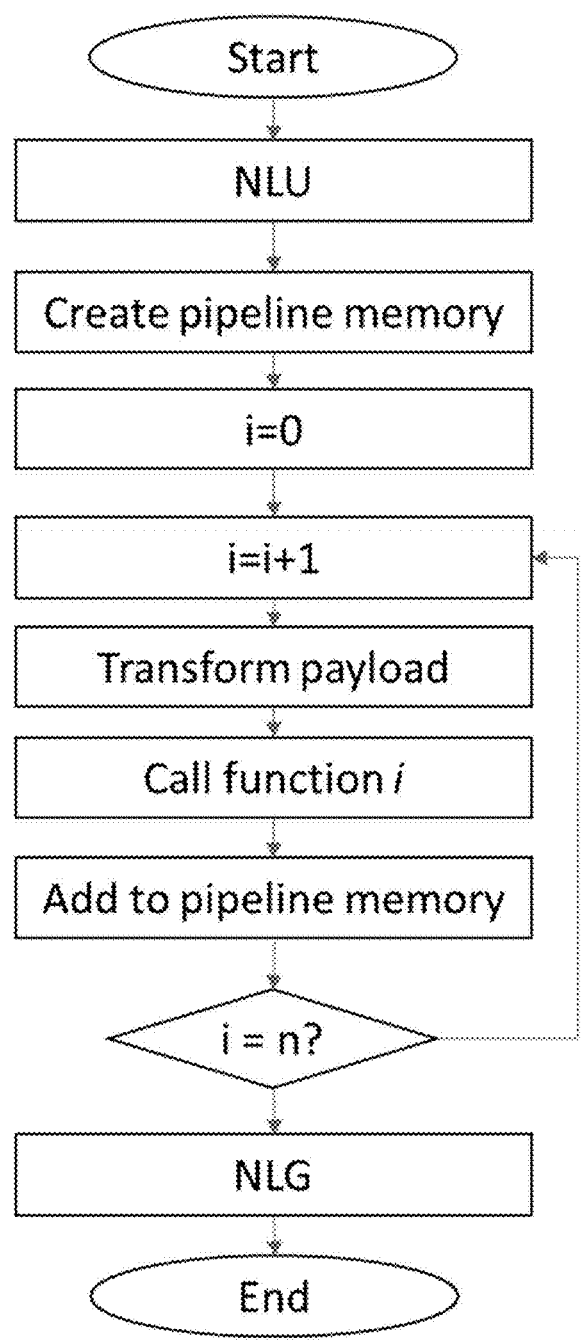
FIG. 6 exemplarily depicts a detailed flow chart for steps 102 and 103 of method 100.

More specifically, with reference to FIG. 6 and the flow chart, a natural language understanding (NLU) is created where the conversational artifacts are mapped. Conversational artifacts include the intents (i.e., how do you identify what a user is talking about such as if a user says "hello" and "hello" is mapped to a greeting to convey the intent of the user as greeting the chatbot), entities (i.e., "Hello Bob" could be mapped to the entity of a user and "Hello Greg" would then be mapped to a second user with the same intent but a different entity), and context variables (i.e., in the conversational interface, there is the context that is part of the conversation such as "hello (intent greeting), my name is Bob (entity), and I would like to book a flight from Boston to Seattle" where the context variables are the items that are catalogued (name, flight, destination, etc.) to use throughout the lifetime of the conversation).

Next, a pipeline memory is created such that the conversation can be used to perform an action on a business practice where the context variables can be forwarded and fill in items based on the context variables. That is, the BOM (e.g., exemplarily shown in FIG. 5) and VOC files are ingested from the specification. For example, the specification defines an airline to fly from Boston to Seattle as well as the parameters of the plane, flight times, etc. that are all business variables in the BOM.

Through chatting with the user trying to schedule the flight, the interface that can schedule the flight can refer to the user by name, and the BOM defines possible take off times, landing times, seat availability, gate number, etc. In this step, the BOM and VOC files are parsed, the code that performs the functions is also mapped (i.e., the invention is agnostic to the code), and the BOM and VOC files are mapped to artifacts to create the conversation. In addition to defining these concepts, the pipeline provides a programmatic type (string, float, integer, etc.).

Since the BOM file is already uploaded, this is used to programmatically create appropriate entities with their values and their synonyms, programmatically create appropriate intents with examples, and programmatically create dialogue nodes that perform slot filling to get the context variables. For example, the BOM file can include a statement such as "a flight has a departure time" which can be used by our invention to create a slot filling not to get the context variable "departure time" from the user when they ask to book a flight. Also, the BOM file can include a statement such as "a flight has a departure city and an arrival city" which can be mapped to an entity "city" which lists city names with major airports (using appropriate databases). This entity can be used in the conversational agent to identify when a user provides their departure and arrival cities in natural language. The VOC file would contain synonyms to "arrival city", for example, like "destination" which can also be included when creating the entity. Finally, the intent of "booking a flight" and corresponding examples ("I want to reserve a flight", "purchase a plane ticket", etc.) can be derived from the BOM/VOC files and input/output dictionaries which can contain information like "a flight is associated with tickets", "tickets give permission to fly from a given city to a destination", etc. which define the concepts related to booking travel.

Moreover, a dictionary of the pipeline memory is created. The dictionary that is created is forwarded to each function that can be performed by the chatbot.

Then, a loop is performed from 1 to "n" (n being an integer of the number of functions in the conversational interface) where each function is called from the dictionary to perform an action that leads to the intent being realized. The specification that is received dictates how to generate the conversation agent and which function to call.

That is, the invention performs a transformation where the invention declaratively structures information into the payload. Then, a function call is made (API/Container/Actual function code) (i.e., airline function date of travel; from where to where is three pieces of information). This function call takes these pieces of information and tries to book a flight by getting exact times to fly and picks a seat. Then, the function tries to book a taxi and it only cares about your arrival time and destination. The arrival time and destination were generated by the first function in the pipeline of booking the flight. The next function uses that information to book your rental car. Now, the invention has two functions and adds this second function to the pipeline. And, then the invention can aggregate information between functions. This information is used for a response.

Finally, in the loop, this is added to the pipeline memory. Every time the interface does a new function, it calls information from the past. The chatbot is built around these functions and influences how the chatbot is created.

Once the loop is finished to the "n" functions, a natural language generation (NLG) is performed and is related to the loop of the different functions (i.e., make an email, set a task, a flight booker, etc.). Therefore, in the BOM file, one has flight information and in the BOM file for a taxi, the invention does not need to ask user for a lot of the information because the invention already has it from the previous function (i.e., the flight booker function). So, the chatbot is dictated around the specification and what is extracted. The chatbot only discusses with user what it needs. That is, the specification is saying that the invention already knows the items and one can make use of these things that are already known to generate the artifacts. Accordingly, the technology is improved itself (i.e., an improvement to functioning of a technology of chatbots).

Thereby, the invention facilitates the automatic creation of an NLU function based on input dictionary, the automatic creation of an NLG function based on the output dictionary, and a declarative configuration file to define the pipeline of the functions.

Figure 2:
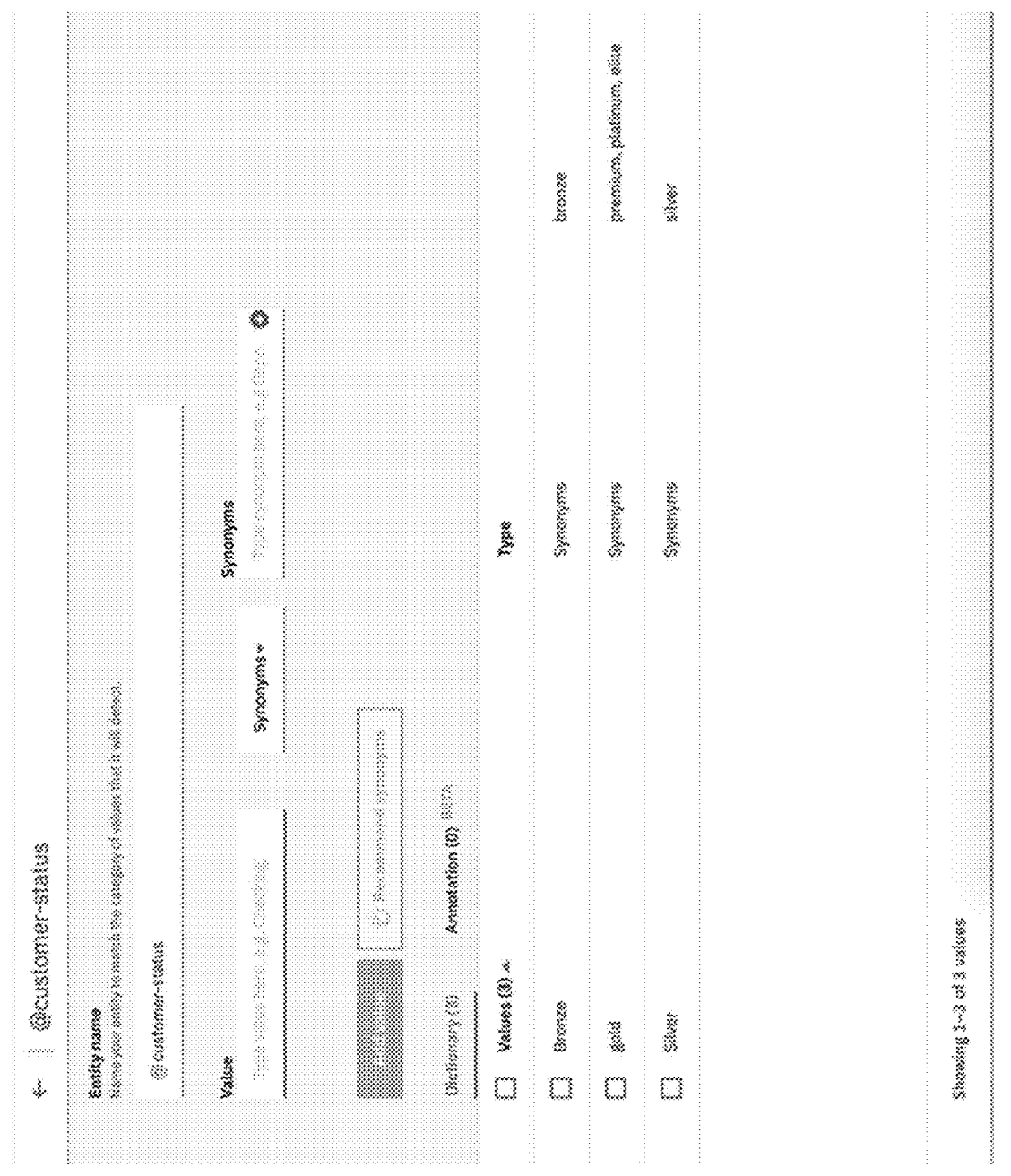
Figure 3:
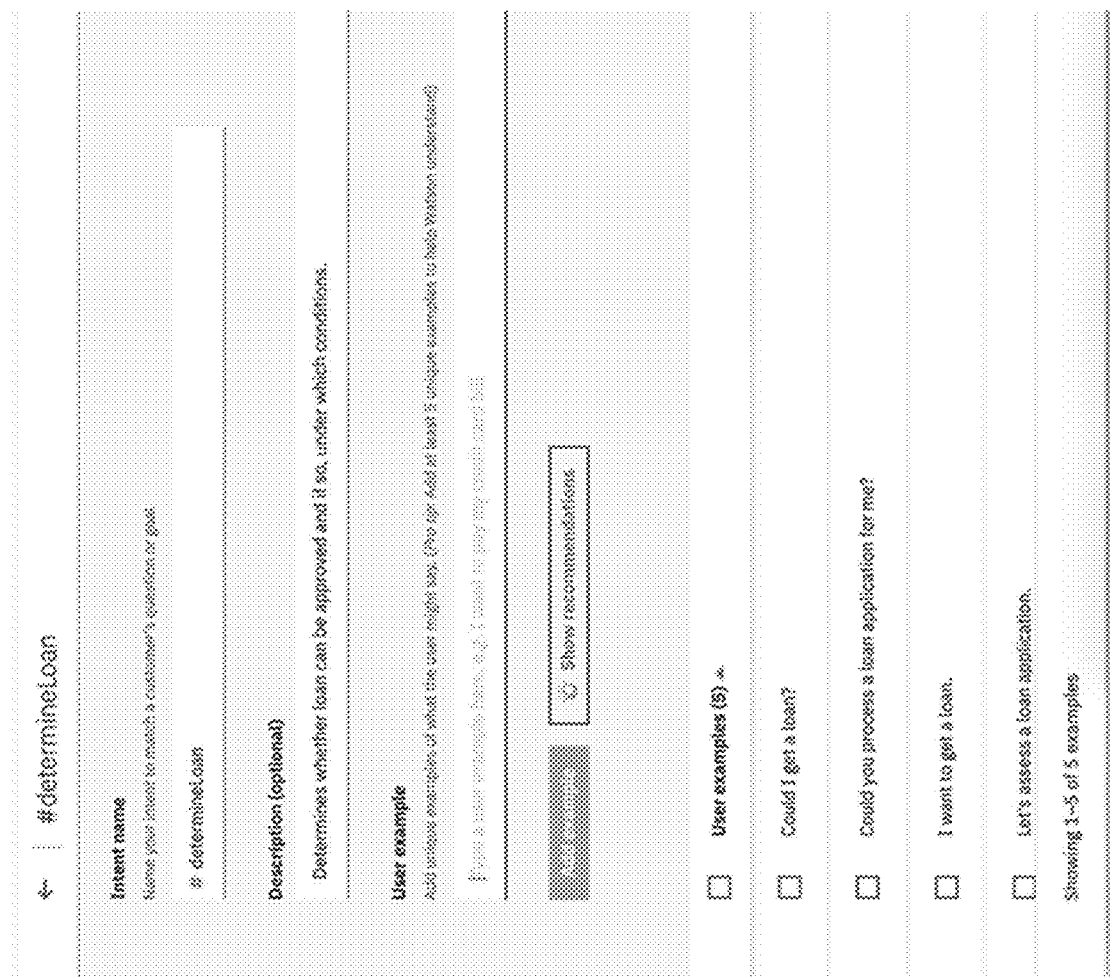
FIG. 3 exemplarily depicts an interface to automate the creation of intents according to the method 100.
Figure 4:
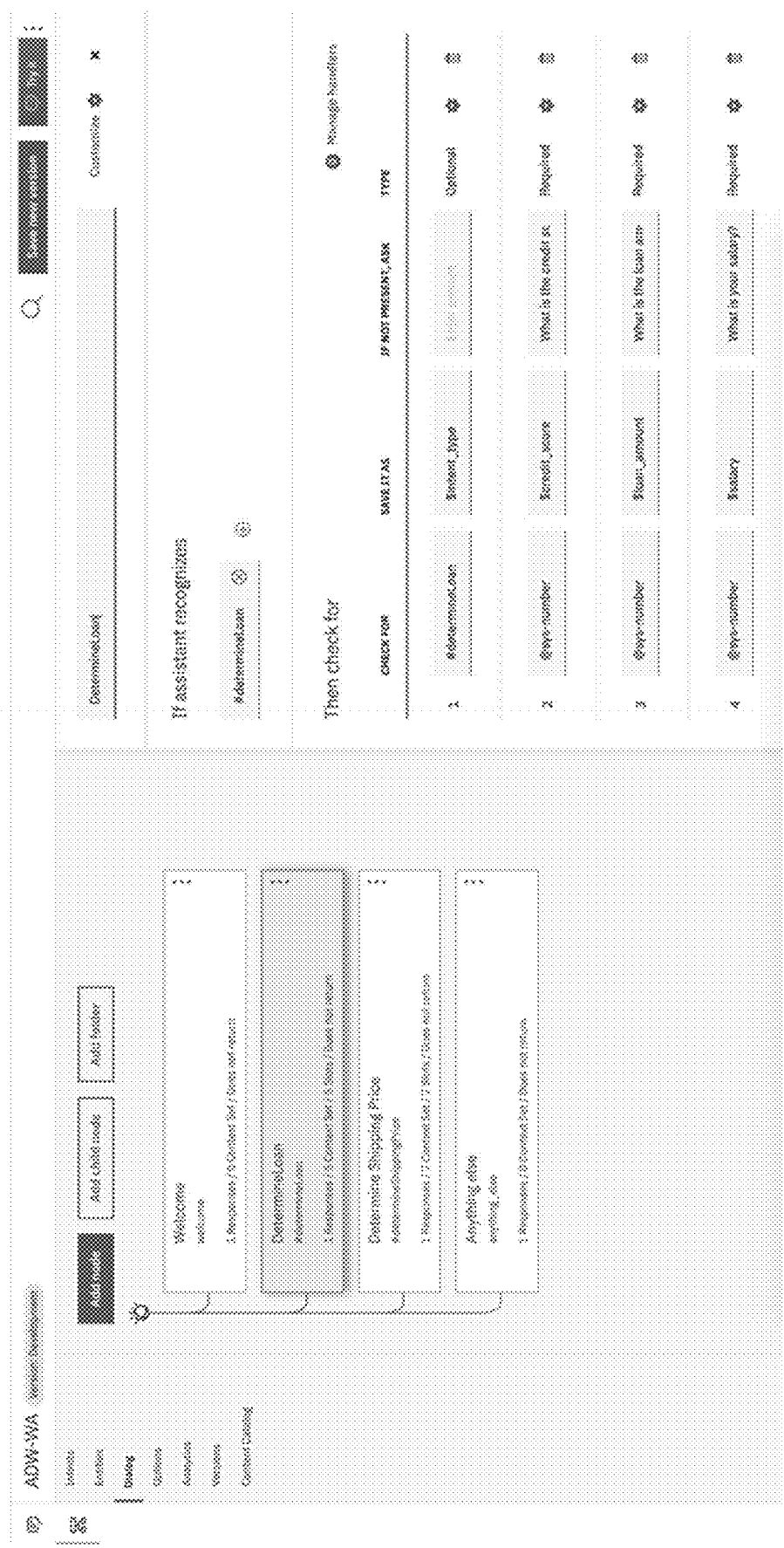
FIG. 4 exemplarily depicts an interface to automate the creation of dialog nodes according to the method 100.
Figure 5:
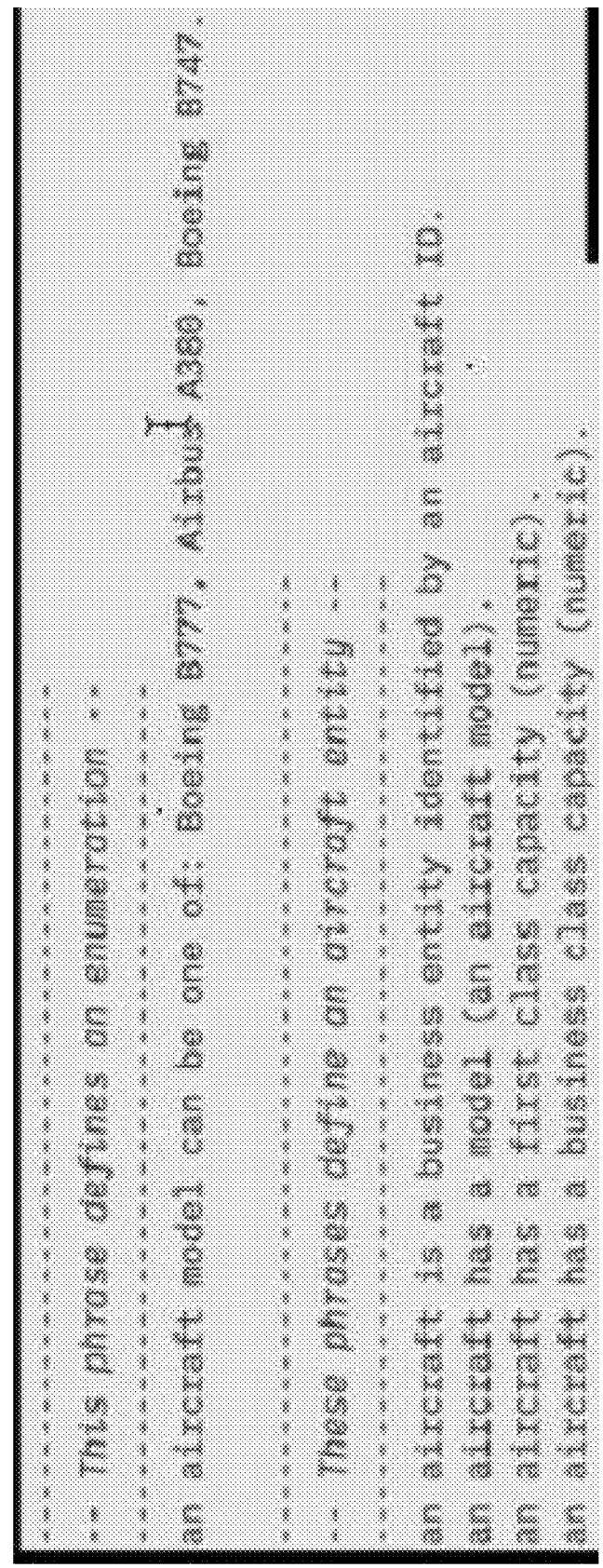
FIG. 5 exemplarily depicts a business object model (BOM) file.

With reference to FIGS. 2-4, the invention generates the examples and other conversational artifacts (i.e., entities, intents, dialog nodes, etc.) at build time to create the chatbot before it interacts with users and does not rely on data mining of previous conversations but on business domain knowledge and resources like business object models and function specifications. Thus, the invention can keep a human intervention out of the agent creation loop and does not use previous conversational logs but instead uses business domain knowledge and function specifications.

With reference to FIG. 2 and to describe the automatic creation of the entities in more detail, the invention determines which concepts in the BOM and VOC files should be defined as entities. Input and output dictionaries of functions can also help determine what concepts should be defined.

Some concepts may have system entities already defined in an assistant program (e.g., sys-number, sys-date, sys-person). It is easy to associate sys-number and sys-date with concepts because they data type is the same as the entity type. However, it is more difficult to associate sys-person and sys-location with concepts because their data type would be a "string" in the BOM/VOC files. One approach is a data driven one where we perform named-entity recognition on a database associated with the BOM/VOC files. If an overwhelming amount of data entries associated with a concept are classified as a named-entity then the invention can associate that named entity with the concept.

After determining which entities to create, the invention populate their values by making use of the VOC file which includes some verbalizations of the concepts defined in the BOM file. If the data is still incomplete, a more sophisticated data mining approaches may be adopted using other techniques in the art such as using conceptNet which is a publicly available resource of word relationships. Data mining and named-entity recognition on function logs and relevant databases can also augment the list of synonym. Then, a list of synonyms is compiled which requires some data mining, semantic understanding, and syntactic understanding approaches.

That is, in summary, FIG. 2 depicts an example of an entity that was created in addition to entity values. The entity "customer-status" is defined in the BOM file as a concept pertaining to the travel domain which can have 3 values "bronze", "gold", "silver". Synonyms for each can be found in the VOC file and through syntactic parsing.

With reference to FIG. 3, FIG. 3 depicts a user interface and is discussed with reference to automating the creation of intents. The invention determines intent of a function from the input and output dictionary. This would rely on semantic understanding and natural language generation or summarization techniques. Examples of an intent's verbalization are provided. For example, the invention adopts a natural language understanding/generation approach that relies on paraphrasing a few examples.

Regarding FIG. 4, FIG. 4 exemplary depicts a user interface for the creation of dialog nodes. To automate the create of dialog nodes, the invention defines what variables need to be obtained through slot filling. To do this, the input dictionary is used to determine what slots will be created. Questions to require slot filling can be simple template questions (e.g., What is the <entity>?). In one optional embodiment, a response template can also be created based on the output dictionary. This can be done by placing a key-value pair in a simple English sentence (e.g., the <key> is <value>).

Thus, the invention enables a conversational interface specific to a set of functions that can do something in the world that is defined by a set of input dictionary and output dictionary (e.g., creating a pipeline and how they feedback to creating a NLU which flows into creating functions). The invention is independent of the programming language that the function is written in (e.g., only focuses on input/output) as well as function agnostic (e.g., understanding intent of the function, two functions that schedule a flight but recognize the intent independent of how it is written).

In addition to the above, the invention also automatically creates conversational artifacts using specification documents in NLU/NLG platforms (i.e., BOM and VOC files). This allows for the composing of outputs into a natural language generation (NLG) and come back and do a function for the user by using the backend calculations to use the chatbot to interface with the user.

To describe the invention via an exemplary use case, the invention can be used for scheduling a flight, a taxi once the flight lands, and a hotel to which the taxi drives the user. The invention assumes the existence of BOM and VOC files describing the travel domain (booking flights, reserving taxis and hotels, etc.) in addition to input/output dictionaries of functions that can perform the tasks of booking the flight, taxi and hotel given the appropriate values (e.g., travel date is Jun. 1, 2021, etc.).

The function dictionaries can look something like this: the book_flight( ) function takes as input {departure_date, departure_city, arrival_city, return_date} and the output {flight_number, seat_number, ticket_price}. The conversational artifacts that need to be derived from these artifacts are 1) intents, 2) entities, 3) context variables, and 4) dialog nodes. To create the intent of "book a flight", the invention uses the BOM file as described above and function dictionaries to create an intent. Starting from these artifacts the invention can use a paraphrasing language model to obtain variants of this intent and use these examples to train an intent recognition model. This reduces the burden on developers to create conversational interfaces to their computer programs and learn about conversational systems too.

Entities such as city can be created from the same artifacts to enable the conversational system to identify such entities in the natural language phrases when the user provides their origin and destination locations (needed to hook a flight).

This is important since without identifying relevant intents, the conversational system will fail to collect the necessary inputs for the function to execute correctly. Finally, creating dialog nodes allow the conversational agent to ask for the required inputs and store them in context variables and pass them to the function. By obtaining the inputs from the input dictionary and a description of them from the BOM file, the invention can create the dialog nodes to ask for the information (e.g., "what date would you like your flight to depart") that needs to be stored in the context variables. This is important since it allows the system to formulate human consumable questions to collect the information that function needs to execute correctly.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memo storage circuits.

Referring again to FIG. 7, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and. Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 8:
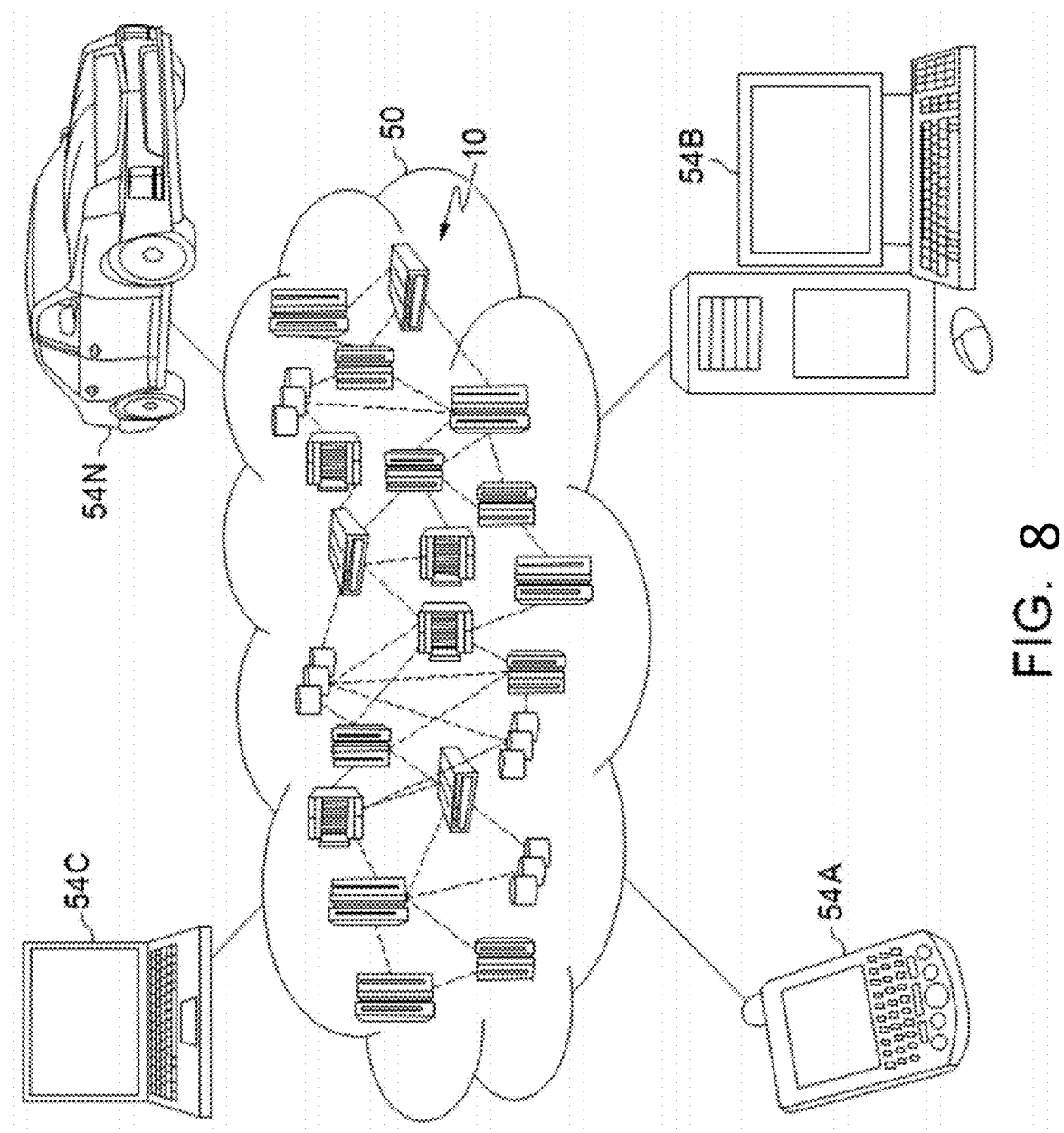
FIG. 8 depicts a cloud computing environment 50 according to an embodiment of the present invention.

Referring now to FIG. 8, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 8 are intended to be illustrative only and that computing nodes 10 and cloud computing environment 50 can communicate with any type of computerized circuit over any type of network and/or network addressable connection (e.g., using a web browser).

Figure 9:
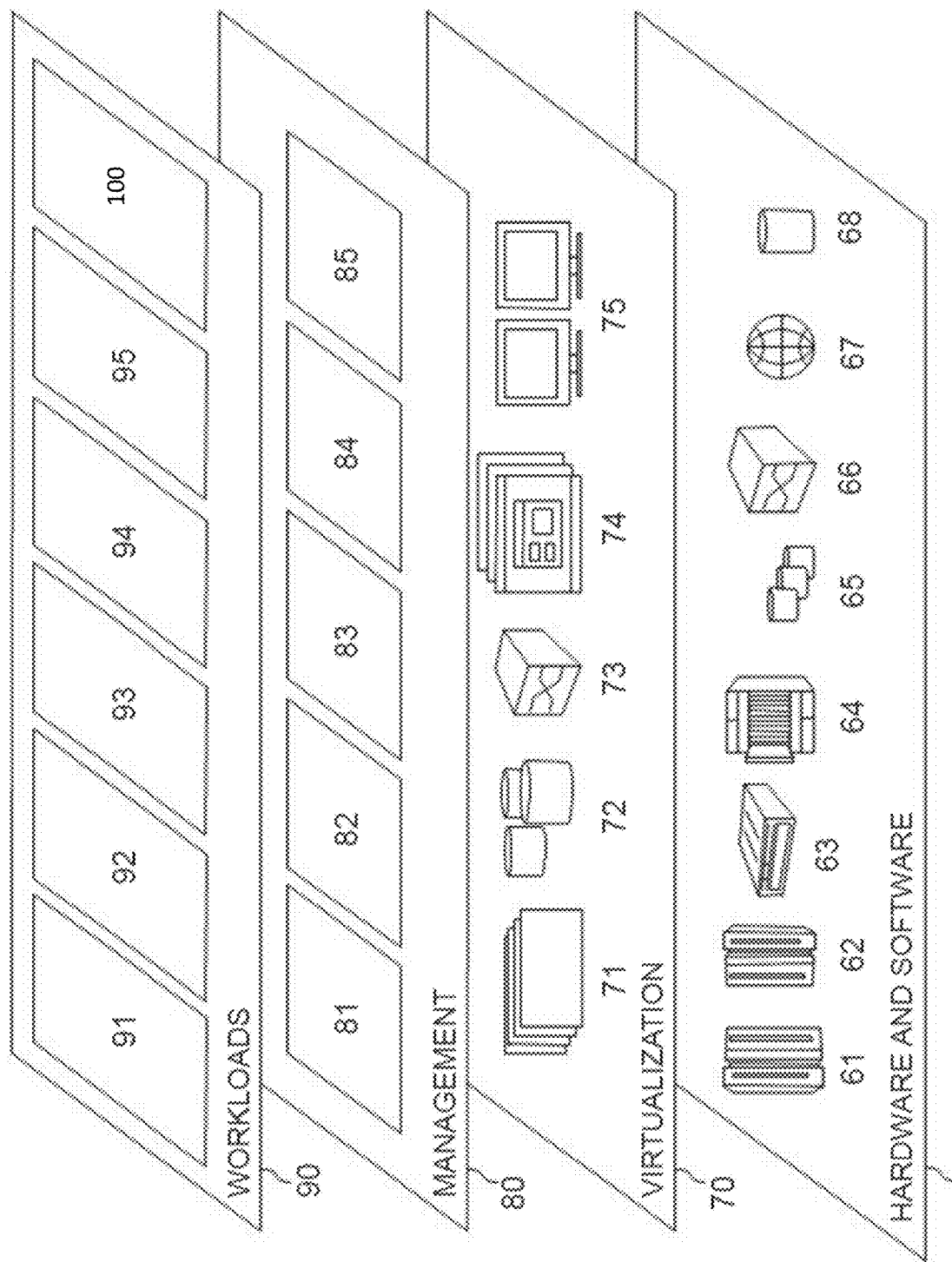
FIG. 9 depicts abstraction model layers according to an embodiment of the present invention.

Referring now to FIG. 9, an exemplary set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the conversational interface generation method 100.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented conversational interface generation method, the method comprising:
   in a conversational agent building phase:
      determining a conversational artifact for an external computer program from a specification of the external computer program, wherein the specification includes business object model (BOM) files, Key-value property verbalization (VOC) files, and input/output dictionaries; and
      generating a conversational interface for the external computer program based on the conversational artifact for the external computer program included in the specification,
   wherein the specification is a pre-existing specification corresponding to the external computer program.

2. The computer-implemented method of claim 1, wherein the specification includes a definition of an intended functionality of the external computer program.

3. The computer-implemented method of claim 1, wherein the specification includes the business object model (BOM) files and the Key-value property verbalization (VOC) files that are used by the generating to author the conversational interface without using a deep learning-based language model.

4. The computer-implemented method of claim 1, wherein the conversational artifact is programmatically created from the specification based on a provided programmatic type.

5. The computer-implemented method of claim 1, further comprising:
   creating a dictionary of pipeline memory based on the conversational artifact; and
   forwarding the dictionary to a function that calls from the dictionary to perform an action that leads to the intent being realized.

6. The computer-implemented method of claim 1, wherein the conversational artifact comprises at least one of an intent, an entity, a context variable, and a dialog node.

7. The computer-implemented method of claim 1, embodied in a cloud-computing environment.

8. The computer-implemented method of claim 1, wherein the conversational interface is deployed in a runtime phase and uses the business object model (BOM) files, the Key-value property verbalization (VOC) files, and the input/output dictionaries.

9. The computer-implemented method of claim 1, wherein the generating is performed in a loop from 1 to n where each function is called from the input/output dictionaries to perform an action that leads to an intent of the conversational artifact being realized, where n is an integer of the number of functions in the conversational interface, and
   wherein, in each loop, every new function that is called calls information from a past loop.

10. The computer-implemented method of claim 1, wherein the conversational interface is limited to query only based on the specification.

11. A computer program product for conversational interface generation, the computer program product comprising a computer-readable storage medium having program instructions embodied therewith, the program instructions executable by a computer to cause the computer to perform:
    in a conversational agent building phase:
       determining a conversational artifact for an external computer program from a specification of the external computer program, wherein the specification includes business object model (BOM) files, Key-value property verbalization (VOC) files, and input/output dictionaries; and
       generating a conversational interface for the external computer program based on the conversational artifact for the external computer program included in the specification,
    wherein the specification is a pre-existing specification corresponding to the external computer program.

12. The computer program product of claim 11, wherein the specification includes a definition of an intended functionality of the external computer program.

13. The computer program product of claim 11, wherein the specification includes the business object model (BOM) files and the Key-value property verbalization (VOC) files that are used by the generating to author the conversational interface without using a deep learning-based language model.

14. The computer program product of claim 11, wherein the conversational artifact is programmatically created from the specification based on a provided programmatic type.

15. The computer program product of claim 11, further comprising:
    creating a dictionary of pipeline memory based on the conversational artifact; and
    forwarding the dictionary to a function that calls from the dictionary to perform an action that leads to the intent being realized.

16. A conversational interface generation system, said system comprising:
    a processor; and
    a memory, the memory storing instructions to cause the processor to perform:
       in a conversational agent building phase:
          determining a conversational artifact for an external computer program from a specification of the external computer program, wherein the specification includes business object model (BOM) files, Key-value property verbalization (VOC) files, and input/output dictionaries; and
          generating a conversational interface for the external computer program based on the conversational artifact for the external computer program included in the specification,
       wherein the specification is a pre-existing specification corresponding to the external computer program.

17. The system of claim 16, wherein the specification includes a definition of an intended functionality of the external computer program.

18. The system of claim 16, wherein the specification includes the business object model (BOM) files and the Key-value property verbalization (VOC) files that are used by the generating to author the conversational interface without using a deep learning-based language model.

19. The system of claim 16, wherein the conversational artifact is programmatically created from the specification based on a provided programmatic type.

20. The system of claim 16, embodied in a cloud-computing environment.

\* \* \* \* \*